United States Patent [19]

Brown

[11] Patent Number: 5,181,053
[45] Date of Patent: Jan. 19, 1993

[54] MULTI-FOCAL CONTACT LENS

[75] Inventor: Howard J. Brown, Memphis, Tenn.

[73] Assignee: Contact Lens Corporation of America, Memphis, Tenn.

[21] Appl. No.: 521,620

[22] Filed: May 10, 1990

[51] Int. Cl.$^5$ .............................. G02C 7/04
[52] U.S. Cl. .................... 351/161; 351/177
[58] Field of Search ........... 351/160 R, 160 H, 161, 351/162, 177

[56] References Cited

U.S. PATENT DOCUMENTS

| | | | |
|---|---|---|---|
| Re. 25,286 | 11/1962 | DeCarle | 351/161 |
| 3,031,927 | 5/1962 | Wesley | 351/161 |
| 3,037,425 | 6/1962 | DeCarle | 351/161 |
| 3,279,878 | 10/1966 | Long | 351/161 |
| 3,415,597 | 12/1968 | Harman | 351/160 R |
| 3,684,357 | 8/1972 | Tsuetaki | 351/161 |
| 4,074,469 | 2/1978 | Nuchman et al. | 51/217 L |
| 4,199,231 | 4/1980 | Evans | 351/160.14 |
| 4,418,991 | 12/1983 | Breger | 351/161 |
| 4,508,436 | 4/1985 | Sitterle | 351/161 X |
| 4,525,043 | 6/1985 | Bronstein | 351/161 X |
| 4,580,882 | 4/1986 | Nuchman et al. | 351/161 |
| 4,593,981 | 6/1986 | Scilipoti | 351/161 |
| 4,636,049 | 1/1987 | Blaker | 351/161 |
| 4,637,697 | 1/1987 | Freeman | 351/161 |
| 4,640,595 | 2/1987 | Volk | 351/160 R |
| 4,655,565 | 4/1987 | Freeman | 351/161 X |
| 4,702,573 | 10/1987 | Morstad | 351/161 |
| 4,752,123 | 6/1988 | Blaker | 351/161 |
| 4,765,728 | 8/1988 | Porat et al. | 351/161 X |
| 4,813,777 | 3/1989 | Rainville et al. | 351/161 |
| 4,859,049 | 8/1989 | Muller | 351/161 |
| 4,861,152 | 8/1989 | Vinzia et al. | 351/161 |
| 4,883,350 | 11/1989 | Muckenhirn | 351/160 R |
| 4,890,912 | 1/1990 | Visser | 351/161 |
| 4,890,913 | 1/1990 | DeCarle | 351/161 |

*Primary Examiner*—Scott J. Sugarman
*Attorney, Agent, or Firm*—Lowe, Price, LeBlanc & Becker

[57] ABSTRACT

A tool for forming a soft contact lens having an optical zone formed with a center spherical surface and surrounding aspheric surfaces is disclosed. The tool includes a lens holder having a perfectly centered rearwardly extending cylindrical portion received in a collet of a lens cutting lathe and a transverse front end wall defining a front end opening receiving the lens blank body projecting forwardly through the opening. The lens blank is formed with a mounting flange seated against a rear facing step in the transverse end wall. The lens body is retained in the holder with an insert threadedly received in the holder. A set screw received in the insert applies pressure to the lens blank rear surface to deform the front concave surface which has been previously cut and polished to a spherical surface. The deformed front concave surface is re-cut into spherical shape in at least preselected portions of the front surface so that, upon release of squeezing pressure, the preselected portions of the front surface are aspheric to define portions of the optical zone having continuously variable optical powers. The center of the optical zone preferably remains spherical for improved night vision.

7 Claims, 2 Drawing Sheets

MULTI-FOCAL CONTACT LENS

TECHNICAL FIELD

The present invention relates generally to contact lenses and, more particularly, to multi-focal soft contact lens and apparatus for cutting the opposing surfaces of a contact lens blank on a lens cutting lathe.

BACKGROUND ART

Bifocal contact lens having an optical zone defined by an aspheric posterior curve and a spherical anterior curve are known. The aspheric back curve portion has a controlled degree of change so that, within a predetermined power range, light rays from objects at all distances focus directly on a common focal point. When placed on a human cornea, this contact lens acts as a refractive medium to focus light rays back upon the retina.

The above lens is a multi-focal design with the spherical front curve directly relating to the aspheric optical zone back curve. However, since the aspherical back curve entirely dominates the optical zone, distance night vision becomes impaired. This is because when the eye pupil dilates at night it no longer predominantly receives light through the center region of the lens and instead tends to pick up light further into the aspheric part of the lens which is normally used for near vision.

It is accordingly one object of the present invention to provide a contact lens having aspherical curve characteristics to maintain the advantage of a multi-focal design while providing curvature characteristics, within the optical zone portion of the lens, which improves night vision.

Another object of the invention is to improve night vision by providing a distant vision zone in the center of the optical zone, in the form of a spherical base curve.

Still another object is to provide the foregoing curvature characteristics in a multi-focal soft contact lens.

FIG. 1 is an illustration of a tool 10 used for cutting an aspheric posterior curve in a pre-cut and polished lens blank 12. Tool 10 comprises a lens holder 14 having a cylindrical sidewall 16 formed with internal threads 17 and a transverse front end wall 18 having a central opening 19 receiving the pre-cut lens blank 12 therein. The lens blank body 12 has a diameter corresponding to the diameter of the front end wall opening 19 through which it extends. The lens blank body 12 is formed with an annular flange 20 of a larger diameter which is received against the rear facing surface 22 of the end wall 18 in seating contact thereagainst. A cylindrical retainer 24 having an external thread 25 along its cylindrical sidewall has a central depression 26 in its transverse front end receiving a ball 27 adapted to apply pressure to the center of the lens blank body 12 upon threading of the retainer into the lens holder. In such threaded contact, a radial set screw 28 extending through the cylindrical sidewall 16 of the lens blank holder 14 is rotated to contact and apply a radial tightening pressure to the retainer 24 to tighten the parts 14,24 together. The rear end of the retainer is formed with a rearwardly extending cylindrical extension 29 adapted to be received in the chuck of a lathe in preparation for cutting the front facing surface of the lens blank 12 projecting from the mounting tool 10.

There are a number of problems associated with the prior art device of FIG. 1. For example, once a desired amount of pressure was exerted against the lens 12 by the ball 27, tightening of the set screw 28 to clamp the two pieces 14,24 together tended to shift the cutting axis C of the lens blank in relation to the mounting axis M of the retainer in the collet or chuck. This misalignment tended to cause the lens to be cut off-center. Notwithstanding possible misalignment caused by tightening of the parts 14,24 together with a radial set screw 28, there also existed a tendency for the lens not to run perfectly true in the lathe by virtue of the two part construction wherein the mounting axis M was formed in one part 24 while the cutting axis C was formed in the front or lens blank holder part 14. In other words, the inherent nature of the two-part construction required extremely precise machining tolerances to enable proper alignment of the cutting axis C with the mounting axis M.

It is another object of the present invention to provide a tool for cutting a contact lens wherein the cutting axis is properly aligned with a collet mounting axis of the tool.

Yet another object is to provide a tool for producing a desired distortion in a lens blank body in controlled, easily measured amounts.

Yet another object is to be able to distort the lens blank to permit formation of aspheric surfaces therein in preselected areas of the lens blank.

Another object is to permit distortion of the lens blank in certain areas of the concave surface without distorting other preselected areas of the concave surface to permit the formation of aspheric and spheric surfaces in the lens blank.

Yet another object is to provide a tool for cutting a lens blank wherein the lens cutting axis and the mounting axis are formed in the same component of the tool.

SUMMARY OF THE INVENTION

A multi-focal contact lens, in accordance with the present invention, comprises a lens body having a concave surface and a convex surface with a central optical zone portion confined to the center part of the lens. The optical zone portion includes a spherical curve in the center region of the concave surface and an aspheric curve which surrounds the center spherical region. The center spherical region formed in a predetermined center portion of the optical zone advantageously improves distance night vision by providing a spherical center in the optical zone through which the eye sees far distant objects, compensating for the expansion of the eye pupil at night into radially distant areas of the aspheric curve having greater aspheric curvature for near vision and less curvature of the aspheric curve closer to the central spherical region.

The concave surface may be formed with a carrier portion extending from the periphery of the optical zone out to the edge of the lens. The carrier portion is preferably spherical to control the manner in which the lens edge lifts from the eye and so that oxygen and tears can properly flow under the lens.

The multi-focal contact lens is a soft contact. The spherical curve in the center region of the optical zone portion has a substantially constant optical power adapted to create a predominant far vision image for improved night vision while the aspheric curve surrounding it has a continuous varying optical power as a function of radial distance from the center. The center spherical region preferably has a diameter of approximately 2–4 mm and the aspheric curve begins at the periphery of the spheric curve to extend radially outwardly therefrom. The peripheral surface is essentially spherical.

A tool for forming a contact lens from a lens blank body having front and rear surfaces and a side surface formed with a mounting flange, in accordance with the present invention, comprises a lens holder being open at opposite ends thereof to receive the lens blank body through the rear end opening and to enable the concave surface of the lens blank body to be exposed to a cutting device from the front end opening of the holder. The mounting flange is in seating contact with a rear facing portion of the front end wall surrounding the opening. An insert, mounted in the lens holder, has a front end wall for contacting the periphery of the lens blank body (i.e., the flange thereby being sandwiched between the seat of the front end wall and the insert) to retain the body in the front end opening. A distortion force applying means, mounted within the retainer, applies a force to a rear surface of the lens blank body which distorts the curvature of the concave surface.

The lens holder is preferably a hollow cylindrical body having a rearwardly extending outer cylindrical surface which is perfectly centered with the longitudinal axis of the holder. The outer surface is adapted to be received in a conventional collet for securing the holder and thereby the lens in a known lens cutting lathe. The hollow cylindrical body thereby defines the mounting axis. The front end portion of the lens holder, located forwardly of the outer cylindrical surface, is formed with the transverse front end wall and front end opening within the wall. The cylindrical edge subtending the opening contacts the outer cylindrical surface of the lens blank in centering engagement to thereby align the cutting axis of the lens blank with the mounting axis of the lens holder by providing appropriately centered surfaces machined into the same lens holder body.

An interior thread is formed in the hollow cylindrical body of the lens holder rearwardly of the transverse front end wall. The retainer is a substantially cylindrical member having an exterior thread engaging the interior thread of the lens holder. The front end face of the cylindrical container is adapted to face and loosely contact the rear surface of the lens blank body to thereby act as a rear stop retaining the lens blank within the front end opening, in cooperation with the rear facing surface of the transverse front end wall acting as a front stop. The front and rear stop arrangement advantageously locates the lens blank within the front end opening without applying a force to the lens rear surface which would distort the lens concave surface.

The distortion force applying means is preferably a set screw extending through the center of the insert, in threaded engagement therewith, to contact the center portion of the lens blank body rear surface. The set screw may have an exterior thread engaging a threaded central bore extending through the insert. The front end face of the set screw which is adapted to contact the lens blank rear surface has a central depression defined by a surrounding edge in the front end face. This edge establishes points of contact (or a continuous line of contact) with the lens blank rear surface, the locus of the points of contact describing a circle preferably being a circular line of pressure points continuously radially spaced from the center of the lens blank rear surface. The depression in the front end face of the set screw may be conical, semispherical, etc., and the continuous edge defining the points of contact is preferably a rounded edge in cross-section to prevent cutting into or cracking of the lens blank.

A method of fabricating a multi-focal contact lens from a cylindrical lens blank having two opposed surfaces comprises the steps of cutting and polishing one of the opposing surfaces to a concave spherical shape and squeezing the lens blank to deflect and deform at least part of the spherical surface by a controlled amount. At least preselected portions of the polished deformed surface are then re-cut to a desired concave spherical surface so that upon release of the deforming pressure the said desired concave spherical surface becomes an aspheric concave surface in the preselected portions. The other opposed surface of the lens blank is then finished to form a convex surface of the lens.

In accordance with a preferred feature of the invention, a center portion of the concave surface is not re-cut so that upon release of deforming pressure the center portion of the lens remains spherical with an aspheric curve surrounding it. The center spherical surface and the surrounding aspheric surface are within the optical zone portion of the lens.

The concave surface may also be formed with a carrier portion extending from the periphery of the optical zone out to the edge of the lens. The carrier portion is preferably defined by a spherical curve.

The spherical curve in the center region of the optical zone portion has a substantially constant optical power adapted to create a predominant far vision image for improved night vision while the aspheric curve surrounding the center spherical region is of continuous varying optical power.

The center spherical region preferably has a diameter of approximately 2-4 mm and the aspheric curve begins at the periphery of the spheric curve to extend radially outwardly therefrom.

The lens is squeezed by applying pressure against the other opposed (e.g., rear) surface to deflect, by distortion, the opposed (e.g., front) concave surface which has been pre-cut to spherical shape. The pressure is preferably applied through a plurality or continuous line of contact points surrounding the center of the other surface. The plural contact points preferably define a continuous circular line of force where the points of pressure are equi-spaced from the lens center. This application of pressure will not result in distortion of the spherical center region of the opposed surface during squeezing. In the event that pressure is applied to the center of the other opposed surface during squeezing, which deforms the center portion of the opposed surface as well as the surrounding portions thereof, the spherical center portion may nonetheless be maintained by limiting the re-cutting process to those areas outside the center portion in which spherocity is desired to be maintained.

Still other objects and advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BEST MODE FOR CARRYING OUT THE INVENTION

Figure 2:
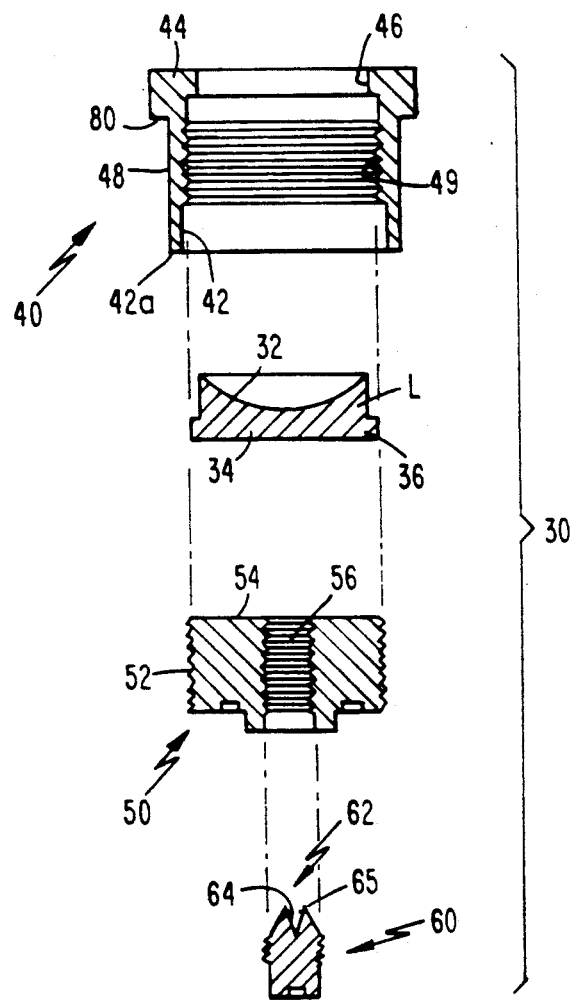
FIG. 2 is an exploded sectional view of a tool for mounting a lens blank to a lathe in accordance with the present invention.
Figure 4:
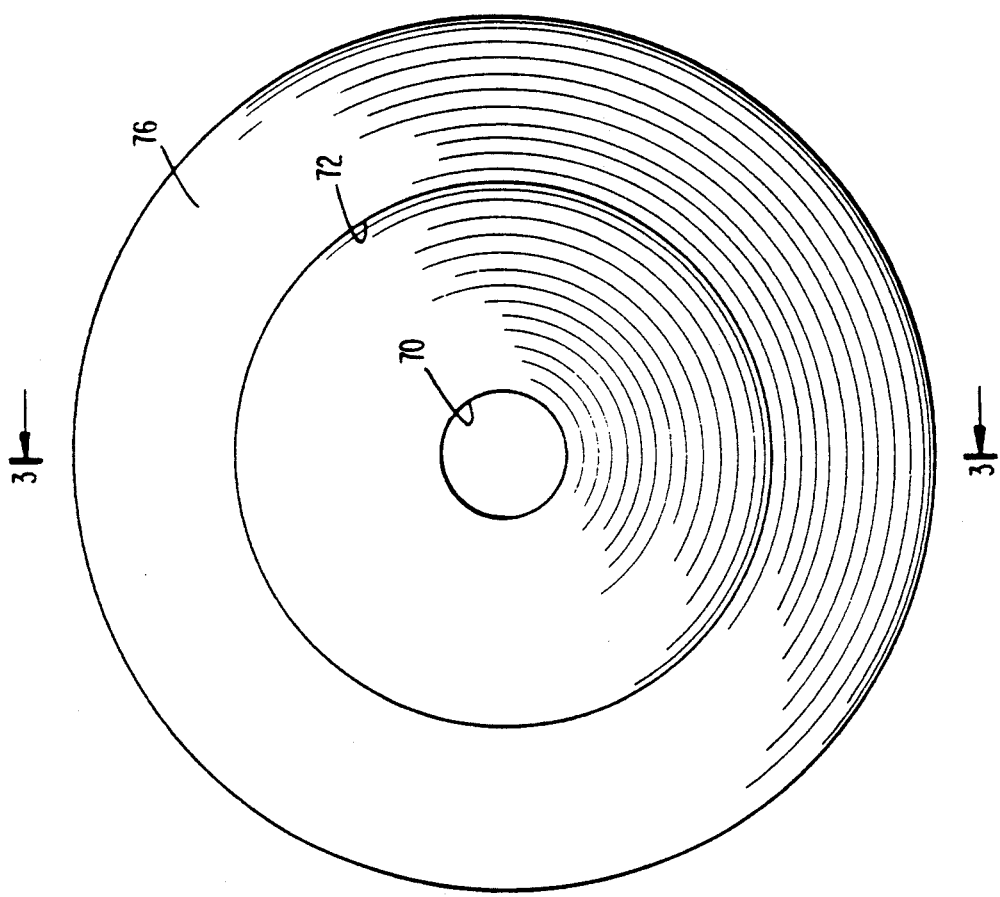
FIG. 4 is a plan view of the lens of FIG. 3, wherein all coordinates of FIGS. 3 and 4 are given wet.
Figure 3:
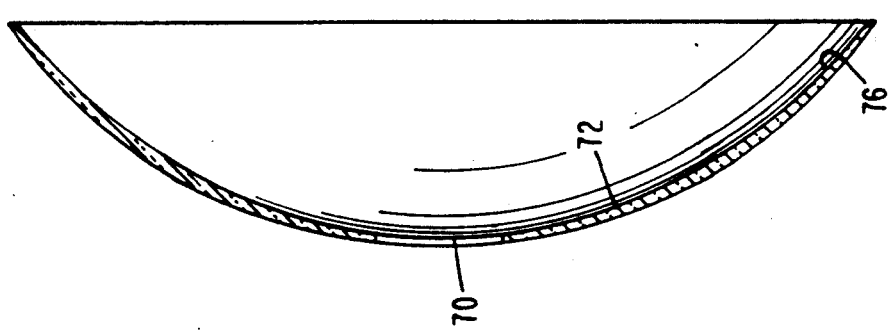
FIG. 3 is a sectional view of a soft contact lens manufactured in accordance with the present invention.

Referring now to FIGS. 2–4, a tool 30 for deforming and shaping a lens blank L in accordance with the method of the invention is depicted. The blank L is of a type from which soft contact lenses are typically formed. The blank L is disc-shaped and usually provided with parallel opposed surfaces 32 and 34 in which one surface is pre-cut and polished to a spherical surface 32 while the rear or other surface 34 remains flat and therefore initially uncut. A flange 36, coplanar with the flat rear surface 34, is cut into the sidewall of the blank for mounting the blank to the tool 10 in the unique manner described infra.

The tool is of a three-part construction comprised of a lens blank holder 40 formed with a hollow cylindrical body portion 42 open at the rear end 42a thereof and a transverse end wall 44 defining a front end opening 46 of the tool 10 through which the front surface 32 of the lens blank L projects. The inner diameter of the hollow cylindrical portion 42 is greater than the outer diameter of the lens blank flange 36 while the diameter of the front end opening 46 corresponds to the diameter of the lens blank sidewall projecting upwardly from the flange. The circular edge defining the front end opening 46 in the transverse front wall 44 defines a cutting axis C' adapted to extend through the geometric center of the lens blank L. The exterior cylindrical surface 48 of the hollow cylindrical body portion 42 is adapted to be received in a conventional collet (not shown). This exterior surface 48 defines a mounting axis M' of the tool which is perfectly aligned with the cutting axis C'.

The feature of forming the lens blank holder 40 with an exterior cylindrical surface 48 defining the mounting axis M' and with a transverse front wall 44 having an opening 46 defining the cutting axis C' greatly improves accuracy in cutting the lens blank by facilitating the manufacture of the cylindrical retainer to precise and close machine tolerances within the same manufactured piece.

The pre-cut and polished lens blank L is retained in the front end opening 46 of the lens blank holder 40 with a retainer insert 50 which is a cylindrical body having an exterior diameter generally corresponding to the interior diameter of the hollow cylindrical body 42 of the holder. The retainer insert 50 is formed with an exterior thread 52 adapted to be threaded to an interior thread 49 formed in the lens holder body 40. In the threaded position of FIG. 2B, the front end face 54 of the retainer 50 insert loosely contacts the back surface 34 of the lens blank L including the flange 36. The flange 36 is now sandwiched between the front end transverse wall 44 of the lens holder (front stop) 40 and the front end wall 54 of the retainer insert (rear stop) 50. It is to be understood that the retainer insert 50 does not exert any significant pressure against the rear surface 34 of the lens blank L sufficient to distort the lens blank concave surface 32. The retainer insert 50 is provided merely to mount the lens blank body L in the front end opening 46 with the lens blank front surface 32 extending forwardly of the opening as depicted in FIG. 2.

In accordance with the invention, the pre-cut and polished spherical concave surface 32 of the lens blank L is deformed into an aspheric surface, prior to recutting, by means of a set screw 60 extending through a central bore 56 in the retainer insert 50 to contact the lens blank rear surface 34 and thereby distort by "squeezing" the concave front surface 32 into an aspheric curvature. While squeezed, the concave surface 32 of the lens blank L is cut on the lathe. The cut and polished front surface (spherical before deformation), before releasing and while deformed is aspherical, is re-cut in selected parts back to spherical, and, after release, the selected re-cut parts of the front surface become aspherical. The amount of deformation created by the squeeze is measured with a conventional radiuscope (not shown) which indicates the amount of displacement of curvature from the spherical curve. After inducing the desired amount of deflection as measured on the radiuscope, the concave surface 32 is then re-cut using conventional techniques.

Figure 2A:
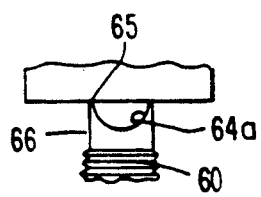
FIG. 2A is a magnified view of a part of the tool of FIG. 2.
Figure 2B:
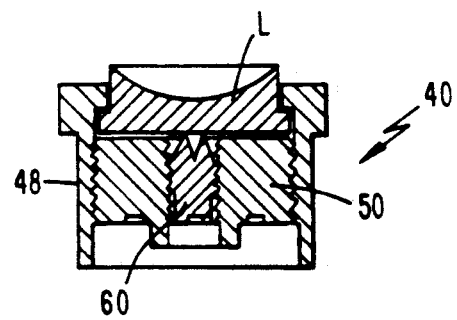
FIG. 2B is a sectional view of the tool parts in assembled relation.

In accordance with a unique feature of the invention, the front end 62 of the pressure applying set screw 60 is formed with a central depression 64 which may be a conical depression as depicted in FIG. 2 or a semispherical depression 64a as depicted in FIG. 2A. A circular ridge 65 defined by the depression 64 and 64a and sidewall 66 of the set screw 60 is adapted to contact the lens blank rear surface 34 to deform the lens concave surface 32 from spherical to aspherical curvature as mentioned above. The deflection transmitted from the rear to front surface of the lens L is greatest along a locus formed by the intersection of the concave front surface 32 with an imaginary cylinder formed by projecting the circular line of force (i.e., points of contact 65 between the set screw 60 and the lens rear surface 34) toward the front surface. Since no pressure is applied to the lens rear surface by the central depression 64, it will be appreciated that the spherical central portion of the lens front surface (i.e., overlying the depression) is not rendered aspherical during distortion or squeezing of the blank. Thereby, when re-cutting the lens concave surface (which is a spherical surface which becomes aspherical during squeezing) to a spherical curve, it will be appreciated that the cut and polished front surface after releasing becomes aspherical from the locus of points undergoing greatest deflection as mentioned above to a desired radially outward extent up to the peripheral edge of the front surface it desired.

Figure 1:
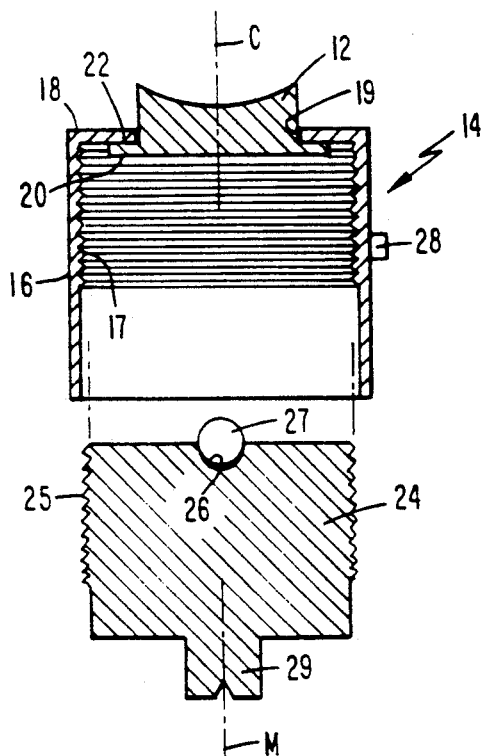
FIG. 1 is an exploded sectional view of a prior art tool for mounting a lens blank body to a lathe.

As depicted in FIG. 2A, the front edge 65 of the set screw which applies the deforming pressure to the lens front surface by contact with the rear surface, is a rounded edge which is semi-spherical in cross-section so as to avoid cutting into the lens. Alternatively, the front edge may be a flat edge less than approximately 1 mm in width. If desired, the set screw 60 may carry a spherical ball (not shown) projecting forwardly from the depression 64 to contact the center of the lens rear surface (i.e., ball to rear surface contact as depicted in FIG. 1).

When cutting the lens blank L on a lathe up to the center of the lens front surface while squeezing the lens, it is possible to render the entire optical zone of the lens into an aspheric condition such as depicted in U.S. Pat. No. 4,580,882 to Nuchman et al or as obtained with a lens cut on the prior art tool of FIG. 1. As a preferred feature of the present invention, however, the set screw is utilized without the ball so that deforming pressure is applied only to the lens blank rear surface by the circular edge 65 surrounding the depression 64. In this manner, the central portion of the optical zone (the central portion corresponding to the diameter of the depression in the set screw) advantageously remains a spherical surface both during and after release of the squeezing pressure while the surrounding portions of the optical zone are aspheric.

By providing a spherical curve in the center portion 70 of the optical zone 72 (the center portion being 2-5 mm and preferably 2-4 mm with an optical zone of 7-9 mm in diameter) as depicted in FIGS. 3 and 4, the spherical curve in the center portion of the optical zone provides the eye with a viewing area for distance night vision. This is advantageous since, when the eye pupils expand at night, there is a tendency for the eye to pick up further into the aspheric parts of the lens located radially outward from the center portion which tends to cut down on distance night vision due to the greater aspherocity in the radially outward portions of the optical zone. By providing a spheric curve in the center portion, however, this problem is effectively eliminated since the pupil can now focus on light rays coming through the center spherical portion for improved distance night vision.

The peripheral carrier portion 76 of the lens front surface 32 is preferably a spherical curve. This carrier portion 76 is located outside the optical zone portion where spherocity is preferred as a means to control the manner in which the contact lens edge lifts from the eye and so that oxygen and tears can flow under the lens. The spherocity of the carrier portion 76 can be maintained by limiting the re-cutting of the spherical lens front surface 32 (prior to squeezing) to only that portion of the optical zone located between the carrier portion 76 and the center portion 70 discussed above.

The forward end of the sidewall 42 of the lens blank holder 40 is formed with an annular step 80 that effectively contacts the front of the collet to properly delimit the depth of the tool within the collet.

The feature of initially cutting and polishing the lens blank concave surface 32 into a spherical shape enables the lens manufacturer to know exactly how much deflection to put into the lens via controlling the squeezing pressure through rotation of the set screw 60 since the manufacturer can precisely read the compressed spherical curve with a radiuscope.

It is an important feature of this invention to limit the extent of the diameter of the spherical center portion 70 of the optical zone 72 to about 2-4 mm in diameter while retaining an aspheric curve in surrounding portions of the optical zone so as to obtain the benefit of improved distance night vision through the center portion of the lens while retaining the bifocal or multiple continuous vision effect from the lens in the aspheric portion of the optical zone surrounding the center portion.

After cutting the concave surface 32 of the lens blank L (which becomes the rear or posterior surface of the finished contact lens) in the manner set forth above, the lens blank is removed from the tool 30 and this concave surface is now affixed with dental wax to an additional tool as known in the art. This additional tool is inserted into the lathe via the collet and the spherical front curve (anterior curve) is cut from rear surface 34 in a known manner to form the front or convex surface of the lens.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

I claim:

1. A multi-focal contact lens, comprising:
a lens body having a concave surface and a convex surface and a central optical zone portion confined to the center part of the lens, said optical zone portion including a spherical curve in the center region of the concave surface and an aspheric curve in the concave surface which surrounds the center spherical region, wherein said spherical curve and aspheric curve and regions surrounding the optical zone have continuous measurable power at any part on the lens.

2. The lens of claim 1, wherein said concave surface is formed with a carrier portion extending from the periphery of the optical zone out to the edge of the lens, said carrier portion being defined by a spherical curve.

3. The lens of claim 2, wherein said multi-focal contact lens is a soft contact lens.

4. The lens of claim 2, wherein said spherical curve in the center region of the optical zone portion has a substantially constant optical power adapted to create a predominant far vision image for improved night vision while the aspherical curve surrounding the center spherical region has a continuous varying optical power.

5. The lens of claim 4, wherein said center spherical region has a diameter of approximately 2-5 mm.

6. The lens of claim 5, wherein said center spherical region has a diameter of approximately 2-4 mm and the aspheric curve begins at the periphery of the spheric curve to extend radially outwardly therefrom.

7. The lens of claim 6, wherein the convex surface is substantially spherical.

* * * * *